(12) United States Patent
Yonezawa et al.

(10) Patent No.: US 7,618,030 B2
(45) Date of Patent: Nov. 17, 2009

(54) SCREW ENGAGEMENT TYPE CLAMP DEVICE, CLAMPING SYSTEM, AND FLUID PRESSURE ACTUATOR

(75) Inventors: Keitaro Yonezawa, Kobe (JP); Hironori Yamada, Kobe (JP)

(73) Assignee: Kosmek Ltd., Hyogo (JP)

( * ) Notice: Subject to any disclaimer, the term of this patent is extended or adjusted under 35 U.S.C. 154(b) by 114 days.

(21) Appl. No.: 11/886,517

(22) PCT Filed: Mar. 14, 2006

(86) PCT No.: PCT/JP2006/304956

§ 371 (c)(1),
(2), (4) Date: Sep. 17, 2007

(87) PCT Pub. No.: WO2006/100958

PCT Pub. Date: Sep. 28, 2006

(65) Prior Publication Data

US 2008/0189924 A1    Aug. 14, 2008

(30) Foreign Application Priority Data

Mar. 18, 2005 (JP) .............................. 2005-118871

(51) Int. Cl.
*B23Q 3/08* (2006.01)
(52) U.S. Cl. ............................ 269/24; 269/32; 269/27
(58) Field of Classification Search ................... 269/24, 269/25–32, 309, 310
See application file for complete search history.

(56) References Cited

U.S. PATENT DOCUMENTS

| 4,351,516 A | * | 9/1982 | Ersoy et al. .................... 269/27 |
| 5,161,788 A | * | 11/1992 | Guzzoni ......................... 269/24 |
| 5,468,136 A |   | 11/1995 | Arisato et al. |
| 5,810,344 A | * | 9/1998 | Nishimoto .................... 269/309 |
| 6,113,086 A | * | 9/2000 | Yonezawa ...................... 269/24 |
| 6,663,093 B2 | * | 12/2003 | Yonezawa et al. ............. 269/24 |
| 6,886,820 B1 | * | 5/2005 | Hausler, III ................... 269/24 |
| 2003/0090047 A1 | * | 5/2003 | Yonezawa et al. ............. 269/24 |
| 2008/0189924 A1 | * | 8/2008 | Yonezawa et al. ............. 29/256 |

FOREIGN PATENT DOCUMENTS

| JP | 7-40165 A | 2/1995 |
| JP | 9-285925 A | 11/1997 |
| JP | 2004-268187 A | 9/2004 |

\* cited by examiner

*Primary Examiner*—Lee D Wilson
(74) *Attorney, Agent, or Firm*—Bacon & Thomas, PLLC

(57) ABSTRACT

An annular piston (21) is inserted into a cylinder hole (20) of a housing (4) so as to be vertically movable and be prevented from rotating. Into a cylindrical hole (24) of the piston (21), a cylindrical rotating member (25) is inserted while prevented from moving vertically. A ball screw mechanism (28) is provided between the piston (21) and the rotating member (25). On an outer peripheral surface of the rotating member (25), a circulation passage (59) which communicatively connects a start end and a terminal end of a male spiral groove (56) is formed in a recessed manner. Into a guide hole (29) formed in an upper half of the housing (4), an output rod (30) is inserted rotatably and movably vertically. An input portion (41) of the output rod (30) is connected to the rotating member (25) so as to transmit rotation. By driving the piston (21) upward, a bolt (45) provided on an upper end portion of the output rod (30) is engaged with an internal threaded hole (12) of a work (10).

20 Claims, 9 Drawing Sheets

SCREW ENGAGEMENT TYPE CLAMP DEVICE, CLAMPING SYSTEM, AND FLUID PRESSURE ACTUATOR

TECHNICAL FIELD

The present invention relates to a screw engagement type clamping apparatus using a pressurized fluid and a clamping system using the clamping apparatus, and further relates to a fluid pressure actuator to be preferably used for the clamping apparatus.

BACKGROUND OF THE INVENTION

As this type of screw engagement type clamping apparatus, there is a conventional one described in Patent Document 1 (Japanese Unexamined Patent Publication No. 7-40165).

This conventional technique is constructed as follows.

A clamp rod is inserted vertically into a through hole of a base. The clamp rod is provided with a clamping external thread which engages with an internal threaded hole of an object to be fixed, an elevating external thread to be engaged with an elevating nut, and a pressing portion which presses the base from above, in the recited order toward the upward. Then, when an air impact wrench rotates the clamp rod, the clamp rod lowers according to screw engagement with the elevating nut, and the clamping external thread engages with the internal threaded hole of the object to be fixed. Thereby, the object is fixed to the base.

Patent Document 1: Japanese Unexamined Patent Publication No. 7-40165

SUMMARY OF THE INVENTION

Problem to be Solved by the Present Invention

The above-described conventional technique is excellent in that the clamping external thread can be powerfully screwed into the internal threaded hole, however, the conventional technique leaves room for improvement in the following point.

It is necessary to arrange a large-sized air impact wrench above the clamp rod, so that the apparatus increases in height. To eliminate a phase deviation when starting screw engagement of both threads, the air impact wrench must rotate the clamp rod continuously, so that the consumption of compressed air is great.

Therefore, the above-described conventional technique is preferable for large-sized apparatuses such as a tire vulcanizing machine or a pressing machine, however, the use thereof for small-sized apparatuses is comparatively limited.

An object of the present invention is to provide a compact and energy-saving screw engagement type clamping apparatus.

Means for Solving the Problem

In order to accomplish the objective mentioned above, according to the present invention, for example, as shown in FIG. 1 through FIG. 3, FIGS. 4A and 4B, FIGS. 5A and 5B, or FIG. 7 and FIG. 8, an apparatus which pulls and fixes an object (10) to be fixed having an internal threaded hole (12) by a screw engagement force of an engaging bolt (45) is constructed as follows.

An annular piston (21) is inserted into a cylinder hole (20) provided in a housing (4) so as to reciprocate axially and to be prevented from rotating. A cylindrical rotating member (25) is inserted into a cylindrical hole (24) of the piston (21) so as to be prevented from moving axially. A ball screw mechanism (28) is provided between the piston (21) and the rotating member (25). An output rod (30) is inserted into a guide hole (29) formed in the housing (4) rotatably and movably axially. An input portion (41) of the output rod (30) is connected to the rotating member (25) so as to transmit rotation. The bolt (45) provided on a leading end portion of the output rod (30) is constructed so as to engage with the internal threaded hole (12) of the object (10) to be fixed.

The present invention brings about the following function and effect.

During a locking drive, the piston in the housing is moved for locking to one end in the axial direction by a pressurized fluid. Then, the rotating member rotates around the axis via the ball screw mechanism, and the rotating member rotates the output rod. Then, the engaging bolt provided on the leading end portion of the output rod engages with the internal threaded hole of the object to be fixed, and the object is pulled and fixed to the housing by the screw engagement force.

The rotating member is inserted into the cylindrical hole of the piston, and the input portion of the output rod is connected to the rotating member, so that the housing can be prevented from increasing in height. Therefore, the clamping apparatus can be formed compact.

During the locking drive, it is only required to move the piston to one end in the axial direction by the pressurized fluid, so that the consumption of the pressurized fluid such as compressed air or pressurized oil is smaller than in the case of the impact wrench of the conventional technique.

In the present invention, for example, as shown in FIG. 1 through FIG. 3, it is preferable that the guide hole (29) is formed radially inward from the cylindrical hole (24) of the piston (21).

In this case, not only the height of the housing but also the lateral width of the housing can be made small, so that the clamping apparatus can be formed more compact.

In the present invention, for example, as shown in FIG. 1 through FIG. 3, or FIG. 7 and FIG. 8, it is preferable that the following structure is added.

The ball screw mechanism (28) includes a female spiral groove (55) having a plurality of pitches formed on the cylindrical hole (24) of the piston (21), at least one male spiral groove (56) having substantially one pitch formed on an outer peripheral surface of the rotating member (25), and a number of balls (57) inserted between the female spiral groove (55) and the male spiral groove (56) so as to roll. A circulation passage (59) which communicatively connects a start end and a terminal end of the male spiral groove (56) is formed in a recessed manner on the outer peripheral surface of the rotating member (25), so as to allow the balls (57) to get over a partition wall (60) formed between adjacent groove portions of the female spiral groove (55).

In this case, a peripheral wall of the rotating member can be effectively used as a space for installing the circulation passage, so that the housing becomes smaller in size in the radial direction. As a result, the clamping apparatus becomes more compact.

In the present invention, for example, as shown in FIG. 1 through FIG. 3, it is preferable that an advancing means (43) which presses the output rod (30) toward the internal threaded hole (12) is provided.

In this case, when starting screw engagement between the engaging bolt of the output rod and the internal threaded hole, the bolt being rotated is pressed against the internal threaded hole by the advancing means, whereby the screw engagement can be reliably made.

It is preferable that the advancing means (43) made of an elastic material such as a spring or rubber is provided between the output rod (30) and the rotating member (25).

In this case, the above-described reliable screw engagement can be realized by a simple structure.

It is preferable that, for example, as shown in FIG. 1 through FIG. 3, or FIG. 7 and FIG. 8, at least one of the following structures (A) and (B) is added to the present invention.

(A) The housing (4) is provided with a supply port (71) into which a fluid for detecting a release state is supplied. The supply port (71) is communicatively connected to an exterior space via an opening and closing portion (73) arranged so as to face in an axial direction between the rotating member (25) and the piston (21).

In this case, the release state can be reliably detected by using the rotating member and the piston.

(B) The housing (4) is provided with a supply port (72) into which a fluid for detecting a lock state is supplied. The supply port (72) is communicatively connected to an exterior space via an opening and closing portion (74) arranged so as to face in an axial direction between the housing (4) and the output rod (30).

In this case, the lock state can be reliably detected by using the output rod. In addition, for example, when the internal threaded hole is not formed in the object to be fixed due to a manufacturing failure or the internal threaded hole is defectively machined, a detection signal of a lock state is not sent out. Thereby, it is also possible to check the quality of the formed internal threaded hole.

In the present invention, for example, as shown in FIG. 1 through FIG. 3, it is preferable that a transmission sleeve (38) is inserted into the rotating member (25) so as to transmit rotation and to be radially movable, and the input portion (41) of the output rod (30) is inserted into the transmission sleeve (38) so as to transmit rotation and to be axially movable.

In this case, the rotating member can smoothly rotate the output rod.

In the present invention, for example, as shown in FIG. 1 through FIG. 3, an annular gap (31) which allows the output rod (30) to move radially may be formed between the guide hole (29) of the housing (4) and an outer peripheral surface of the output rod (30).

In this case, the output rod is allowed to move radially with respect to the housing, so that misalignment between the axis of the internal threaded hole of the object to be fixed and the axis of the output rod is allowed.

In the present invention, the output rod (30) may be supported in the guide hole (29) of the housing (4) so as to be prevented from moving radially.

In this case, the axis of the output rod can be used as a positioning reference.

To the present invention, for example, as shown in FIGS. 4A and 4B, the following structure may be added.

Female fitting portions (83), (83) are provided at a predetermined interval in an axial direction on the guide hole (29) of the housing (4), male fitting portions (85), (85) are provided at a predetermined interval in the axial direction on an outer peripheral surface of the output rod (30). In a release state in that the output rod (30) retreats, the female fitting portions (83) and the male fitting portions (85) are spaced axially from each other and the output rod (30) becomes radially movable in the guide hole (29). In a lock state in that the output rod (30) advances, the female fitting portions (83) and the male fitting portions (85) fit each other to constrain the output rod (30) radially in the guide hole (29).

In this case, before starting a locking drive, the misalignment between the axis of the internal threaded hole of the object to be fixed and the axis of the output rod is allowed, and in the lock state, the axis of the output rod can be used as a positioning reference.

In the present invention, the female fitting portions (83) and the male fitting portions (85) may be constructed so as to fit along substantially the whole circumferences.

In this case, positioning accuracy by using the output rod is improved.

In the present invention, for example, as shown in FIG. 9, it is allowed that protrusions (90), (90) radially facing each other are provided on the guide hole (29), escape portions (91), (91) are provided between these protrusions (90), (90), and the female fitting portion (83) is formed on an inner peripheral surface of each of the protrusions (90).

In this case, in a radial direction in which the pair of protrusions face each other, positioning is performed, and in a radial direction orthogonal to the facing direction, misalignment is allowed.

To the present invention, for example, as shown in FIGS. 5A and 5B, the following structure may be added.

At least one intermediate sleeve (88) is arranged between the guide hole (29) and the output rod (30). Protrusions (90), (90) radially facing each other are provided on at least one of an outer peripheral surface of the intermediate sleeve (88) and the guide hole (29), and escape portions (91), (91) are provided between these protrusions (90), (90).

In this case, in the radial direction in which the pair of protrusions face each other, positioning is performed, and in a radial direction orthogonal to the facing direction, misalignment is allowed. Furthermore, the output rod does not come into direct contact with the protrusions, so that its wear is less and its service life lengthens.

To the present invention, for example, as shown in FIGS. 6A and 6B, the following structure may be added.

To the rotating member (25), a hollow rod (95) is connected instead of the output rod (30). The engaging bolt (45) provided on a leading end portion of the hollow rod (95) is constructed to be hermetically connectable to an internal threaded hole (12) of a tested object (92) so that a testing pressurized fluid can be supplied to the tested object (92) via a distribution passage (98) formed in the hollow rod (95).

In this case, the clamping apparatus can be used for a pressure test and a leakage test of a tested object.

As a clamping system using the clamping apparatus of the present inventions, use of at least one of the clamping apparatuses according to the inventions described above or use of a combination of the clamping apparatuses according to the plurality of inventions is possible.

A fluid pressure actuator to be preferably applied to the clamping apparatus of the present invention is constructed as follows, for example, as shown in FIG. 1 through FIG. 3, or FIG. 7 and FIG. 8.

An annular piston (21) is inserted into a cylinder hole (20) provided in a housing (4) so as to reciprocate axially and to be prevented from rotating. A rotating member (25) is inserted into a cylindrical hole (24) of the piston (21) so as to be prevented from moving axially. A ball screw mechanism (28) is provided between the piston (21) and the rotating member (25). The ball screw mechanism (28) includes a female spiral groove (55) having a plurality of pitches formed on the cylindrical hole (24) of the piston (21), at least one male spiral groove (56) having substantially one pitch formed on an outer peripheral surface of the rotating member (25), and a number of balls (57) inserted between the female spiral groove (55) and the male spiral groove (56) so as to roll. A circulation passage (59) which communicatively connects a start end and a terminal end of the male spiral groove (56) is formed in a recessed manner on the outer peripheral surface of the rotating member (25), so as to allow the balls (57) to get over a partition wall (60) formed between adjacent groove portions of the female spiral groove (55).

In this case, the rotating member is inserted into the cylindrical hole of the piston, so that the housing becomes smaller in height. In addition, a peripheral wall of the rotating member can be used effectively as a space for installing the circulation passage, so that the housing becomes smaller in size in the radial direction. As a result, the fluid pressure actuator can be formed compact.

In the present invention of the fluid pressure actuator described above, for example, as shown in FIG. 1 through FIG. 3, or FIG. 7, it is preferable that a transmission sleeve (38) is inserted into the rotating member (25) so as to transmit rotation and to be radially movable, and an input portion (41) of an output rod (30) is inserted into the transmission sleeve (38) so as to transmit rotation.

In this case, the rotating member can smoothly rotate the output rod.

BRIEF DESCRIPTION OF THE DRAWINGS

FIG. 4A is a partial view similar to FIG. 1, showing a release state, and FIG. 4B is a view similar to FIG. 4A, showing a lock state.

FIG. 5A is a view corresponding to a sectional view along the 5A-5A line of FIG. 5B, showing a lock state, and FIG. 5B is a sectional view along the 5B-5B line of FIG. 5A;

FIG. 6A is a view similar to FIG. 3, and FIG. 6B is a sectional view along the 6B-6B line of FIG. 6A;

DESCRIPTION OF THE REFERENCE NUMERALS

4: housing, 10: object to be fixed (work), 12: internal threaded hole, 20: cylinder hole, 21: piston, 24: cylindrical hole, 25: rotating member, 28: ball screw mechanism, 29: guide hole, 30: output rod, 31: annular gap, 38: transmission sleeve, 41: input portion, 43: advancing means (advancing spring, elastic material), 45: bolt, 55: female spiral groove, 56: male spiral groove, 57: ball, 59: circulation passage, 60: partition wall, 71: first supply port, 72: second supply port, 73: first opening and closing portion, 74: second opening and closing portion, 83: female fitting portion, 85: male fitting portion, 88: intermediate sleeve, 90: protrusion, 91: escape portion, 95: hollow rod, 98: distribution passage

BEST MODE FOR CARRYING OUT THE PRESENT INVENTION

Figure 1:
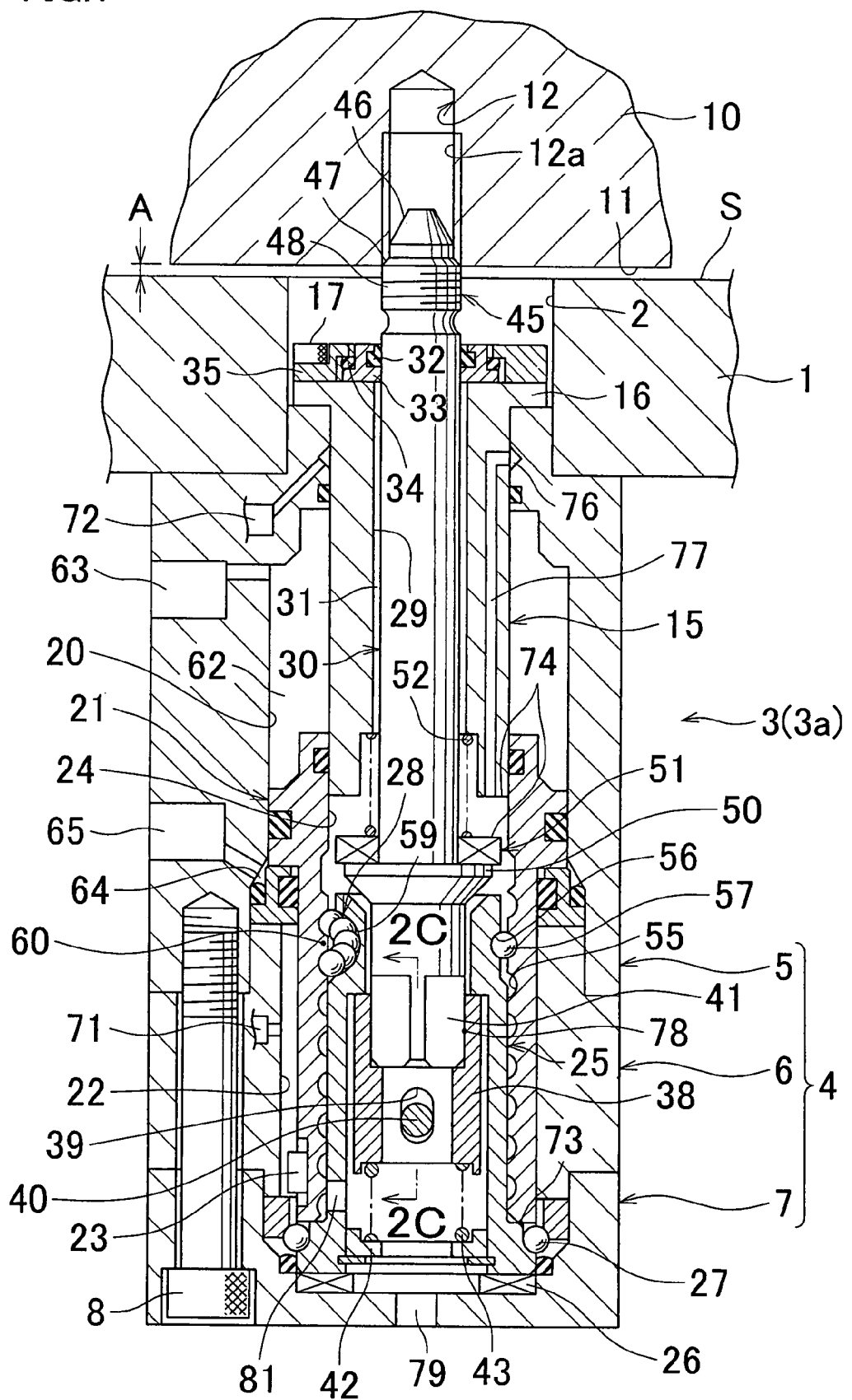
FIG. 1 shows a first embodiment of the present invention, and is a elevational view in section of a screw engagement type clamping apparatus in a release state.
Figure 2A:
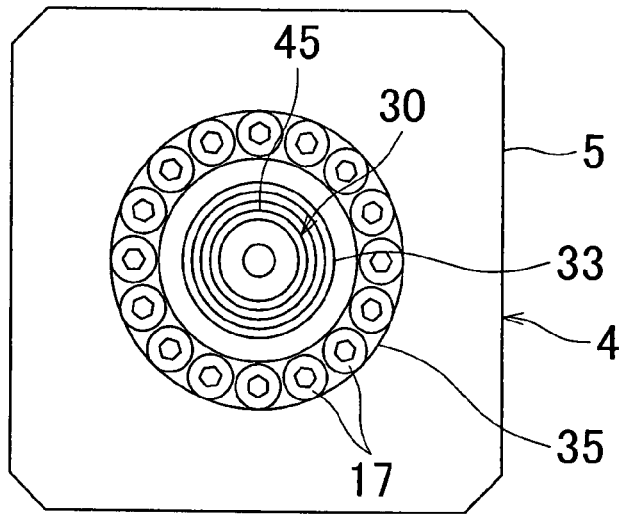
FIG. 2A is a plan view of the clamping apparatus.
Figure 2B:
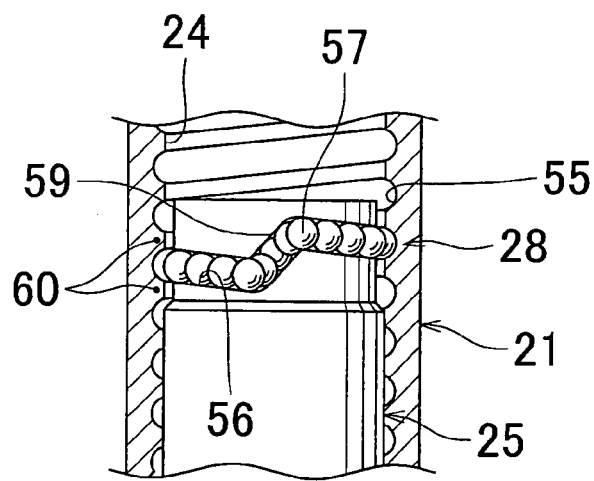
FIG. 2B is a sectional view of a ball screw mechanism provided in the clamping apparatus.
Figure 2C:
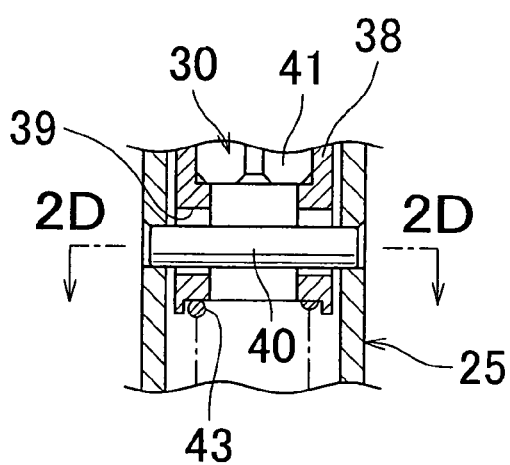
FIG. 2C is a sectional view along the 2C-2C line of FIG. 1.
Figure 2D:
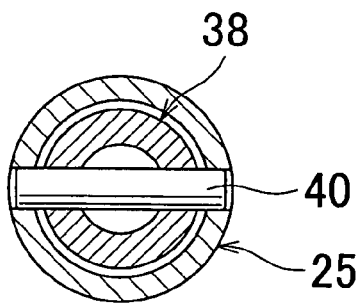
FIG. 2D is a sectional view along the 2D-2D line of FIG. 2C.
Figure 3:
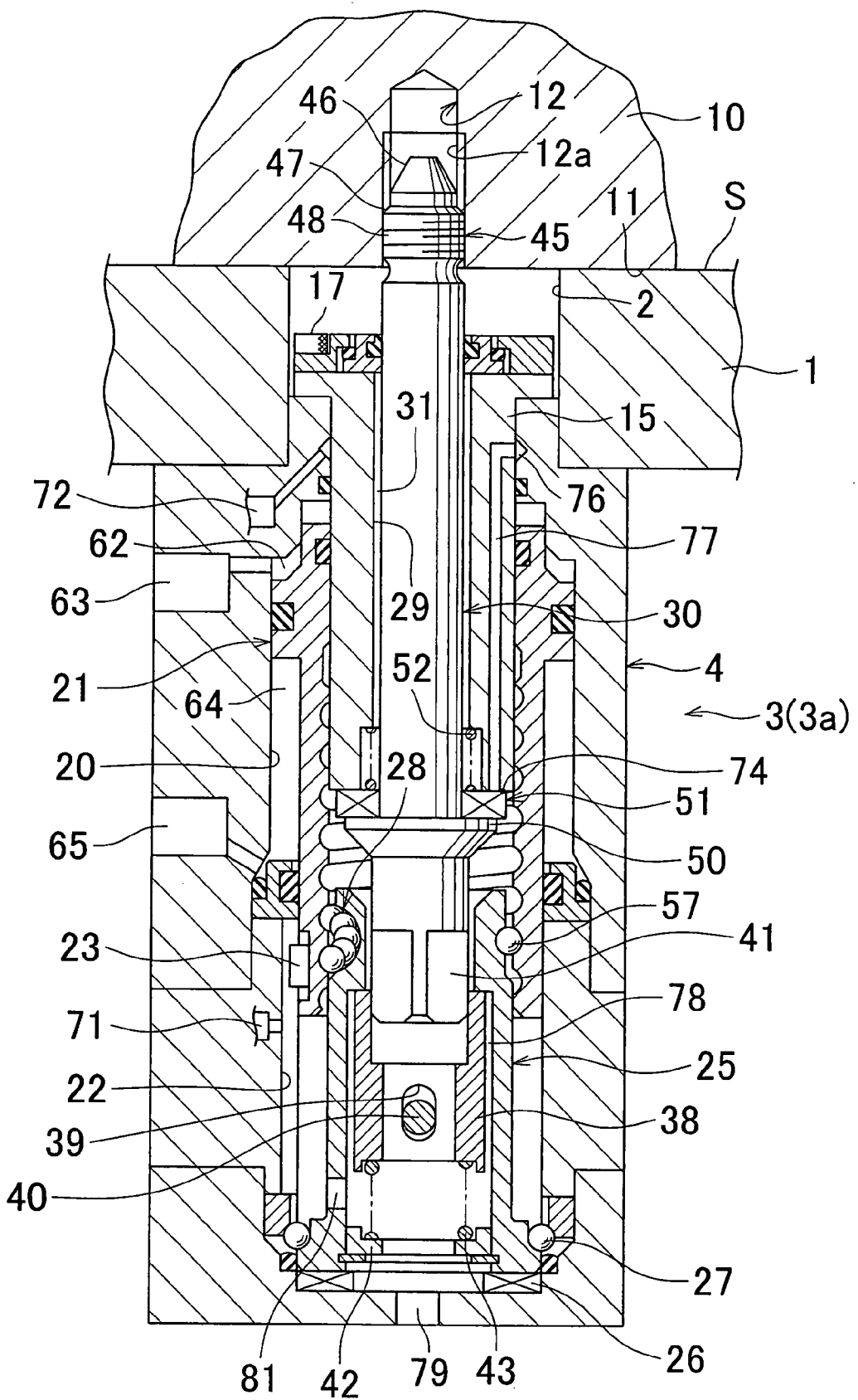
FIG. 3 is a view similar to FIG. 1, showing a lock state of the clamping apparatus.

FIG. 1 through FIG. 3 show a first embodiment of the present invention.

In this first embodiment, a case is illustrated where a screw engagement type clamping apparatus fix and unfix a work. First, a structure of the clamping apparatus will be described with reference to FIG. 1 through FIG. 2D.

FIG. 1 is a elevational view in section of the clamping apparatus in a release state. FIG. 2A is a plan view of the clamping apparatus. FIG. 2B is a partial sectional view of a left side view of FIG. 1, showing a ball screw mechanism provided in the clamping apparatus. FIG. 2C is a sectional view along the 2C-2C line of FIG. 1. FIG. 2D is a sectional view along the 2D-2D line of FIG. 2C.

A table 1 as a support base has a through hole 2. To a peripheral wall of the through hole 2, an upper portion of a housing 4 of the clamping apparatus 3 is fixed with a plurality of attaching bolts (not shown). To an upper housing portion 5 of the housing 4, an intermediate housing portion 6 and a lower housing portion 7 are fixed with a joint bolt 8.

In a work 10 as an object to be fixed, a reference surface 11 and an internal threaded hole 12 are machined. The internal threaded hole 12 is opened downward in the reference surface 11.

A guide cylinder 15 is inserted into the upper housing portion 5. An upper flange 16 of the guide cylinder 15 is fixed to an upper portion of the upper housing portion 5 by a number of fastening bolts 17 (herein, 16 bolts).

Between a cylinder hole 20 formed in the housing 4 and an outer peripheral surface of the guide cylinder 15, an annular piston 21 is inserted so as to reciprocate vertically (axially) and to be prevented from rotating around the axis. Specifically, a rotation stopper key 23 is installed between a key groove 22 formed in a lower half of the cylinder hole 20 and a lower portion of the annular piston 21.

Into a cylindrical hole 24 of the piston. 21, a cylindrical rotating member 25 is inserted via a lower thrust bearing 26 and a radial bearing 27 so as to be prevented from moving vertically and rotatable around the axis. The lower thrust bearing 26 is formed of a low-friction rolling bearing. Between the piston 21 and the rotating member 25, a ball screw mechanism 28 which will be described later is provided.

Figure 10:
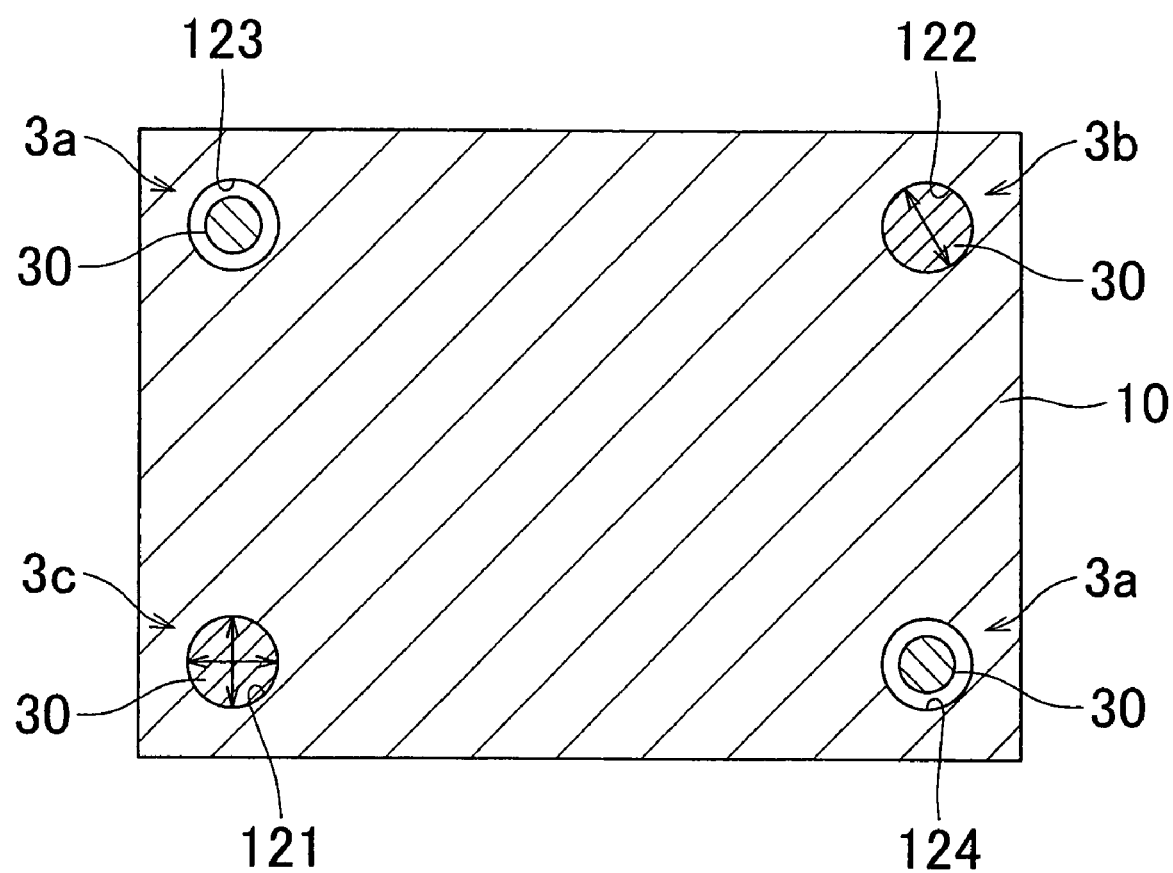
FIG. 10 is a schematic plan view of a clamping system using the clamping apparatuses described above.

A guide hole 29 is formed by a cylindrical hole of the guide cylinder 15. The guide hole 29 is arranged radially inward from the cylindrical hole 24 of the piston 21. Into the guide hole 29, an output rod 30 is inserted rotatably around the axis and movably vertically (axially). Between the guide hole 29 and an outer peripheral surface of the output rod 30, an annular gap 31 is formed. Thereby, in the clamping apparatus 3 of the first embodiment, the output rod 30 becomes radially movable across the whole circumference, and as shown in FIG. 10 described later, the clamping apparatus is constructed as a so-called free type clamping apparatus.

Onto an upper portion of the output rod 30, a floating sleeve 33 is fitted from outside via a dust seal 32 made of rubber or a synthetic resin, and the floating sleeve 33 is supported radially movably in a holding sleeve 35 via a sealing member 34. The holding sleeve 35 is fixed to the guide cylinder 15 by the fastening bolts 17.

The output rod 30 is connected to the rotating member 25 via a universal joint mechanism. In detail, a transmission sleeve 38 is inserted into the rotating member 25. In the transmission sleeve 38, a slot 39 extending vertically is formed, and both ends of a joint pin 40 inserted into the slot 39 are fitted into a peripheral wall of the rotating member 25. Thereby, into the rotating member 25, the transmission sleeve 38 is inserted so as to transmit rotation, radially movable, and vertically movable by a predetermined amount.

An input portion 41 on a lower portion of the output rod 30 is inserted into the transmission sleeve 38 so as to transmit rotation and to be vertically (axially) movable.

Between a spring seat 42 installed on a lower portion of the rotating member 25 and the transmission sleeve 38, an advancing spring 43 is installed. The spring 43 functions as an elastic material (advancing means) which urges the output rod 30 upward.

On an upper end portion (leading end potion) of the output rod 30, an engaging bolt 45 is provided. The bolt 45 includes a tapered portion 46 narrowed toward its leading end, a shoulder portion 47, and a male screw portion 48 in the recited order toward the downward. The male screw portion 48 is constructed so as to make an engagement with a female screw portion 12a of the internal threaded hole 12 of the work 10. In this first embodiment, the male screw portion 48 and the female screw portion 12a are formed of right-handed screw and parallel threads.

Further, the output rod 30 is provided with an expanded portion 50 above the input portion 41. On an upper surface of the expanded portion 50, an upper thrust bearing 51 is placed. The upper thrust bearing 51 is formed of a low-friction rolling bearing. Between the upper thrust bearing 51 and the guide cylinder 15, a returning spring 52 is installed. An urging force of the returning spring 52 is set to a value smaller than an urging force of the advancing spring 43.

The ball screw mechanism 28 is constructed as follows.

On the cylindrical hole 24 of the piston 21, a female spiral groove 55 is formed in a plurality of pitches. A male spiral groove 56 is formed substantially in one pitch on the outer peripheral surface of the rotating member 25. Between these female spiral groove 55 and the male spiral groove 56, a number of balls 57 are inserted so as to roll. A circulation passage 59 which communicatively connects a start end and a terminal end of the male spiral groove 56 is formed in a recessed manner on the outer peripheral surface of the rotating member 25. By a function of the circulation passage 59, the balls 57 are allowed to get over partition walls 60 formed between adjacent groove portions of the female spiral groove 55.

In this first embodiment, the female spiral groove 55 and the male spiral groove 56 are formed of left-handed screw. Instead of providing only one male spiral groove 56 substantially in one pitch, a plurality of male spiral grooves may be provided at intervals in the axial direction.

A release chamber 62 formed above the piston 21 is communicatively connected to a first supply and discharge port 63 for pressurized oil, and a lock chamber 64 formed below the piston 21 is communicatively connected to a second supply and discharge port 65 for pressurized oil. The cross sectional area of the release chamber 62 is set to a value larger than that of the lock chamber 64, and thereby, a release driving force is set to a value larger than a lock driving force.

The intermediate housing portion 6 is provided with a first supply port 71 into which compressed air (fluid) for detecting a release state is supplied. An upper portion of the upper housing portion 5 is provided with a second supply port 72 into which compressed air (fluid) for detecting a lock state is supplied.

The first supply port 71 is communicatively connected to an exterior space via first opening and closing portion 73 arranged so as to face in the vertical direction between a lower end portion (base end portion) of the rotating member 25 and a lower portion (base end portion) of the piston 21. As shown in FIG. 3 described later which illustrates a lock state, the second supply port 72 is communicatively connected to an exterior space via second opening and closing portion 74 arranged so as to face in the vertical direction between a lower end surface of the guide cylinder 15 forming a part of the housing 4 and an upper surface of the upper thrust bearing 51.

The clamping apparatus 3 operates as follows as shown in the release state of FIG. 1 and the lock state of FIG. 3.

In the release state of FIG. 1, pressurized oil in the lock chamber 64 is discharged and pressurized oil is supplied to the release chamber 62, and the piston 21 lowers. The output rod 30 is pressed upward by an urging force of the advancing spring 43.

In this state, when the work 10 is lowered, first, the tapered portion 46 of the engaging bolt 45 is inserted into the internal threaded hole 12 of the work 10, and then the lower portion of the peripheral wall of the internal threaded hole 12 is received by the shoulder portion 47 of the bolt 45.

When the work 10 lowers, in the case where the axis of the internal threaded hole 12 and the axis of the output rod 30 are misaligned, the tapered portion 46 is subjected to inserting resistance from the internal threaded hole 12, so that due to this resistance, the output rod 30, the floating sleeve 33, and the transmission sleeve 38 radially move while aligning.

In this state, due to an urging force of the advancing spring 43, the upper end of the male screw portion 48 of the bolt 45 engages with the lower end of the female screw portion 12a of the internal threaded hole 12. Herein, between a support surface S of the table 1 and the reference surface 11 of the work 10, a contact gap A is formed. However, when the weight of the work 10 is great or a force for handling the work 10 is great, the output rod 30 lowers against the advancing spring 43 and the contact gap A disappears.

In the release state, compressed air in the first supply port 71 is stopped at the first opening and closing portion 73. Therefore, by detecting a pressure rise in the first supply port 71, it can be confirmed that the clamping apparatus 3 is in the release state.

Further, in this release state, compressed air in the second supply port 72 can be exhausted to the outside through an annular groove 76 of the upper housing portion 5, a vertical passage 77 of the guide cylinder 15, a fitting gap 78 between the input portion 41 of the output rod 30 and the transmission sleeve 38, and an exhaust hole 79 of the lower housing portion 7.

When the clamping apparatus 3 in the release state of FIG. 1 is changed into the lock state of FIG. 3, pressurized oil in the release chamber 62 is discharged and pressurized oil is supplied to the lock chamber 64 to raise the piston 21. Then, as shown in FIG. 3, the output rod 30 rotates clockwise in a bottom view via the rotating member 25 and the transmission sleeve 38 and the male screw portion 48 of the bolt 45 is screwed in the female screw portion 12a.

Thereby, first, the output rod 30 rises and the thrust bearing 51 comes into contact with the lower end surface of the guide cylinder 15, and then, the work 10 is strongly pressed against the support surface S of the table 1 by a screwing force of the bolt 45. Further, the number of threads to be screwed of the male screw portion 48 is set to 3 to 5.

In the lock state, the compressed air in the second supply port 72 is supplied to the lower end of the vertical passage 77 through the annular groove 76, however, it is stopped at the second opening and closing portion 74 at the lower end. Therefore, by detecting a pressure rise in the second supply port 72, it can be confirmed that the clamping apparatus 3 is in the lock state.

Further, in this lock state, compressed air in the first supply port 71 can be exhausted to the outside through a horizontal hole 81 formed in a lower portion of the peripheral wall of the rotating member 25 and the exhaust hole 79 in the recited order.

When the clamping apparatus 3 in the lock state of FIG. 3 is changed into the release state of FIG. 1, the pressurized oil in the lock chamber 64 is discharged and pressurized oil is supplied into the release chamber 62 to lower the piston 21. Then, as shown in FIG. 1, the output rod 30 rotates counterclockwise in a bottom view via the rotating member 25 and the transmission sleeve 38, the output rod 30 lowers according to screwing of the male screw portion 48 of the bolt 45 and the female screw portion 12a, and the screwing state is released. Thereafter, the work 10 is raised.

The first embodiment described above has the following advantage.

The clamping apparatus 3 is arranged substantially just below the internal threaded hole 12, so that the housing 4 can be prevented from projecting horizontally. Therefore, an attaching base such as the illustrated table 1 or a jig plate etc becomes small. As a result, the work 10 can be machined by a small-sized machine tool.

The clamping apparatus 3 can secure a great tightening force by means of a force multiplier due to screw engagement. When the above-described internal threaded hole 12 is formed in the work 10 as an internal threaded hole which an assembly bolt for an finished goods is screwed in, a screw tightening force when machining the work 10 and a screw tightening force during final assembling become substantially equal to each other. Therefore, influences due to clamping distortion when machining the work are reduced.

The screw engagement type clamping apparatus 3 can maintain a screw engagement state between the engaging bolt 45 and the internal threaded hole 12 even if supply of pressurized fluid is stopped after the clamping apparatus is changed into a lock state. Therefore, the work 10 in the lock state can be carried easily into a machine tool. In addition, it is not necessary to install a power source for the clamping apparatus in the machine tool, so that the cost of equipment becomes inexpensive. Different from a general fluid pressure clamp, it also becomes unnecessary to check pressure leakage of the clamping apparatus carried into the machine tool.

During a locking drive of the screw engagement type clamping apparatus 3, after pressurized fluid such as pressurized oil reaches a predetermined pressure range, the bolt 45 makes a strong screw engagement and generates a tightening force. Therefore, when a plurality of screw engagement type clamping apparatuses 3 are installed, different from a general bolt tightening apparatus, substantially simultaneous fixation at a plurality of positions with even tightening forces is realized.

In addition, the upper thrust bearing 51 formed of a rolling bearing is installed on the expanded portion 50 of the output rod 30, so that during screw engagement of the output rod 30, only a sliding resistance of thread surfaces of the male screw portion 48 becomes a load. Therefore, a great tightening force is obtained by a small torque, and unevenness in the tightening force is less.

Other embodiments described later also have the same advantage as described above.

FIG. 4 through FIG. 10 show other embodiments of the present invention. These other embodiments will be described by attaching the same reference numerals as in the first embodiment to the components identical (or similar) to those of the above-described embodiment in principle.

Figure 4B:
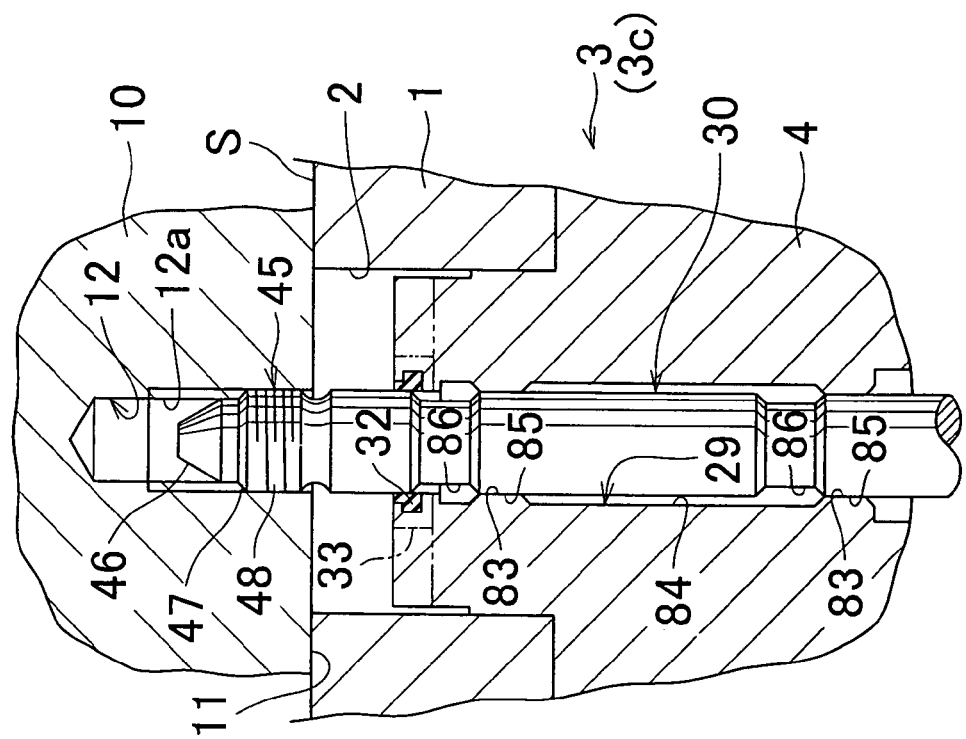
FIGS. 4A and 4B show a clamping apparatus of a second embodiment of the present invention.
Figure 4A:
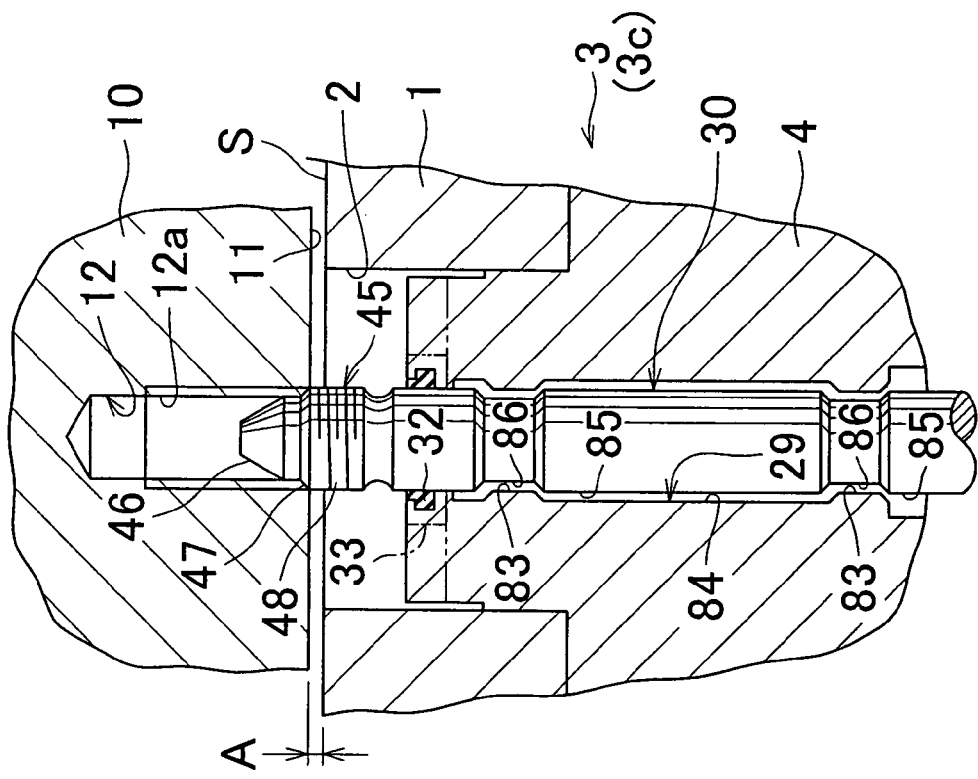

FIGS. 4A and 4B show a clamping apparatus of a second embodiment. FIG. 4A is a partial view similar to FIG. 1, showing a release state. FIG. 4B is a view similar to FIG. 4A, showing a lock state.

This second embodiment is different from the first embodiment in the following point.

On the guide hole 29 of the housing 4, female fitting portions 83, 83 are projected radially inward at a predetermined interval in the vertical direction (axial direction), and between these female fitting portions 83, 83, an annular recess groove 84 is formed. On an outer peripheral surface of the output rod 30, male fitting portions 85, 85 are also formed at a predetermined interval in the vertical direction, and at the upper sides of these male fitting portions 85, 85, annular recess grooves 86, 86 are formed.

In the release state of FIG. 4A in that the output rod 30 retreats downward, the female fitting portions 83 and male fitting portions 85 are spaced vertically, and the output rod 30 becomes radially movable in the guide hole 29. The dust seal 32 is fitted to the floating sleeve 33 (see the schematic illustration indicated by long dashed double-short dashed lines in FIG. 4A) in the same manner as shown in FIG. 1 and FIG. 3 described above.

On the other hand, in the lock state of FIG. 4B in that the output rod 30 advances upward, the female fitting portions 83 and the male fitting portions 85 fit along substantially the whole circumferences to constrain the output rod 30 radially in the guide hole 29.

Thereby, in the clamping apparatus 3 of this second embodiment, the output rod 30 is prevented from moving radially in the lock state of FIG. 4B, and the clamping apparatus is constructed as a so-called datum type clamping apparatus as shown in FIG. 10 described later.

Figure 5B:
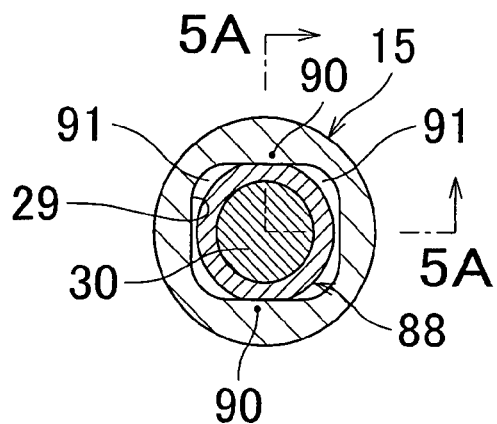
FIGS. 5A and 5B show a clamping apparatus of a third embodiment of the present invention.
Figure 5A:
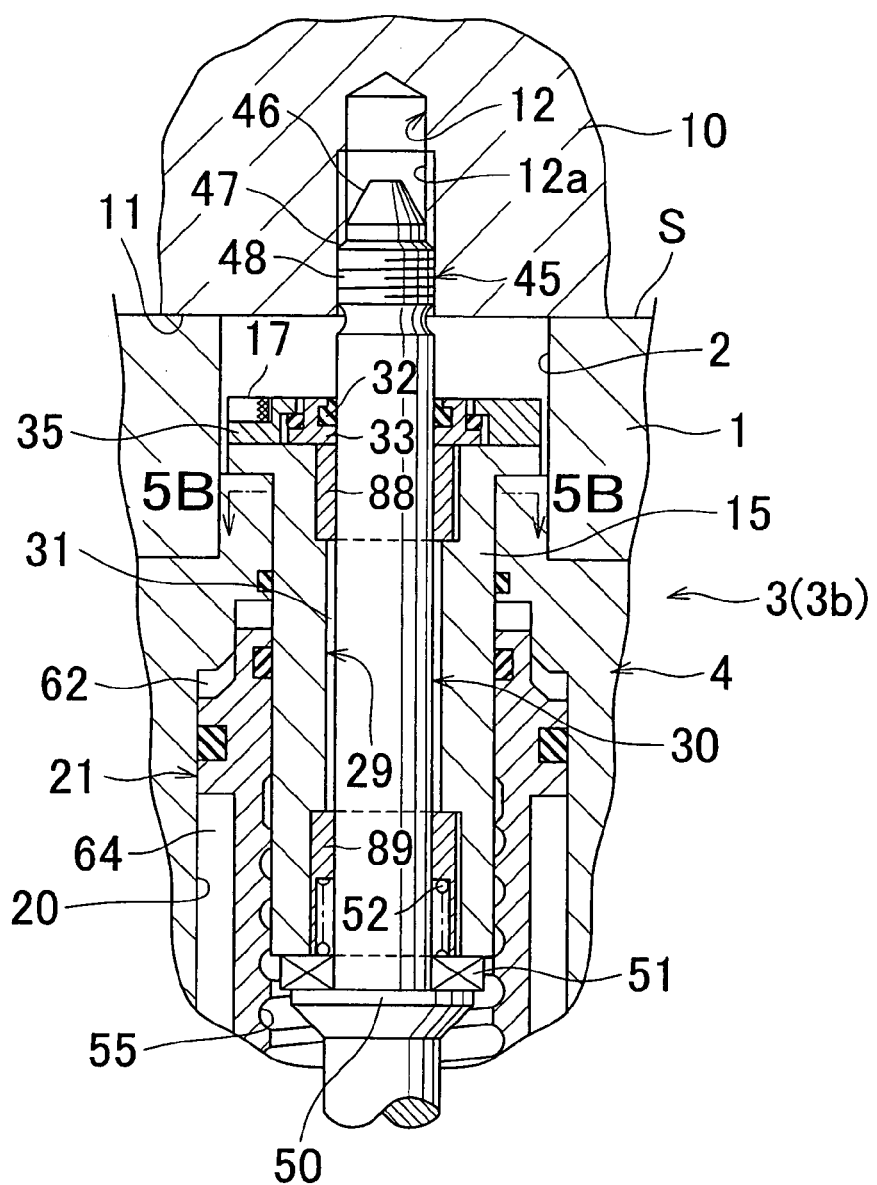

FIGS. 5A and 5B show a clamping apparatus of a third embodiment of the present invention. FIG. 5A is a view corresponding to a sectional view along the 5A-5A line of FIG. 5B, showing a lock state. FIG. 5B is a sectional view along the 5B-5B line of FIG. 5A.

Between the guide hole 29 and the output rod 30, intermediate sleeves 88, 89 are arranged at a predetermined interval in the vertical direction (axial direction). On an outer peripheral side of the upper intermediate sleeve 88, a guide hole 29 is formed into a rectangular shape in a plan view. Thereby, on a peripheral wall of the guide hole 29, protrusions 90, 90 radially facing are provided, and between these protrusions 90, 90, escape portions 91, 91 are provided. The lower intermediate sleeve 89 is also arranged in the guide hole 29 in the same relationship as of the upper intermediate sleeve 88.

Although not illustrated in this third embodiment, as in FIG. 3 described above, a transmission sleeve 38 is inserted into the rotating member 25 so as to transmit rotation and to be radially movable, and into the transmission sleeve 38, the input portion 41 of the output rod 30 is inserted so as to transmit rotation and to be axially movable.

With the above-described structure, the output rod 30 and the intermediate sleeves 88, 89 are constructed so as to move right and left direction in FIG. 5B and be prevented from moving up and down in FIG. 5B with respect to the housing 4. Specifically, the clamping apparatus 3 of this third embodiment is constructed as a so-called diamond-cut type clamping apparatus as shown in FIG. 10 described later.

To change a rotation phase of the protrusions 90, 90 with respect to the housing 4, the fastening bolts 17 are removed and the rotation phase of the guide cylinder 15 with respect to the housing 4 is changed. Incidentally, when sixteen fastening bolts 17 are used as shown in FIG. 2, the rotation phase can be changed in steps of 22.5 degrees.

Instead of or in addition to provision of the protrusions 90 and the escape portions 91 in the guide hole 29, these may be provided on outer peripheral portions of the intermediate sleeves 88, 89.

Arrangement of two intermediate sleeves 88, 89 as illustrated is preferable, however, it is also possible that a single comparatively long intermediate sleeve is arranged, or three or more are arranged.

Figure 6A:
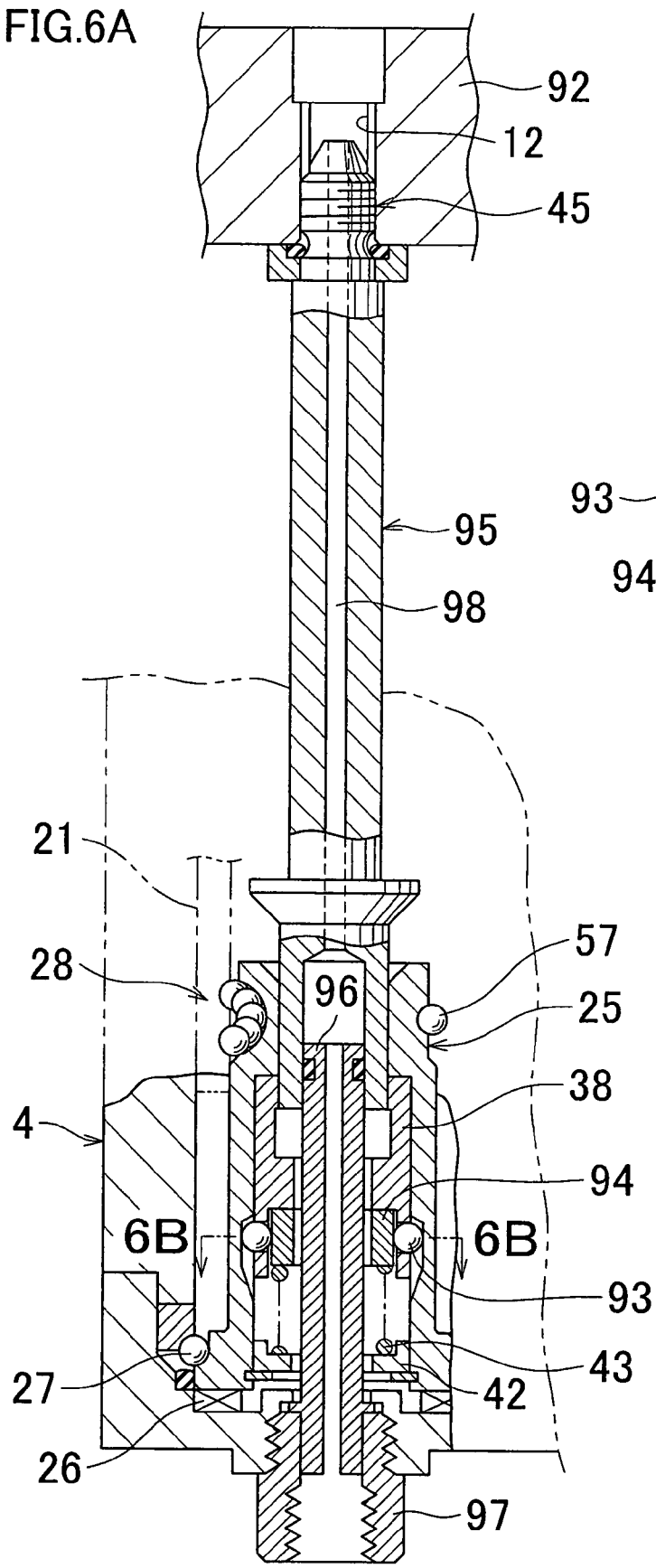
FIGS. 6A and 6B show a usage pattern of the clamping apparatus according to the first embodiment.
Figure 6B:
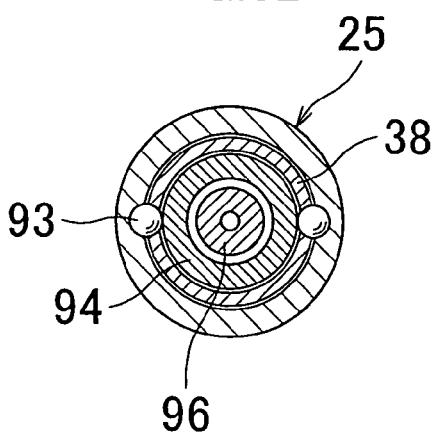

FIGS. 6A and 6B show a usage pattern of the clamping apparatus according to the first embodiment. FIG. 6A is a sectional view of a main portion of a usage state, similar to FIG. 3. FIG. 6B is a sectional view along the 6B-6B line of FIG. 6A.

This usage pattern is constructed so as to allow a testing pressurized fluid to be supplied to an internal threaded hole 12 of a tested object 92. The universal joint mechanism in FIG. 3 is changed as follows.

The transmission sleeve 38 inserted into the rotating member 25 is connected by a plurality of transmission balls 93. An inner sleeve 94 for preventing these transmission balls 93 from coming off is urged upward by the advancing spring 43.

To an upper portion of the rotating member 25, a hollow rod 95 is connected instead of the output rod 30 of FIG. 3. A lower portion of the hollow rod 95 is connected to a nozzle 97 via a pipe 96.

In the state of FIG. 6A, the piston 21 rises and the rotating member 25 rotates the hollow rod 95 via the transmission sleeve 38. Thereby, the engaging bolt 45 provided on an upper end portion of the hollow rod 95 is connected hermetically to the internal threaded hole 12 of the tested object 92. A testing pressurized fluid such as compressed air is supplied to the tested object 92 via the nozzle 97, the pipe 96, and a distribution passage 98 in the hollow rod 95.

The internal threaded hole 12 of the tested object 92 and the male screw portion of the bolt 45 may be tapered threads in place of parallel threads.

Figure 7:
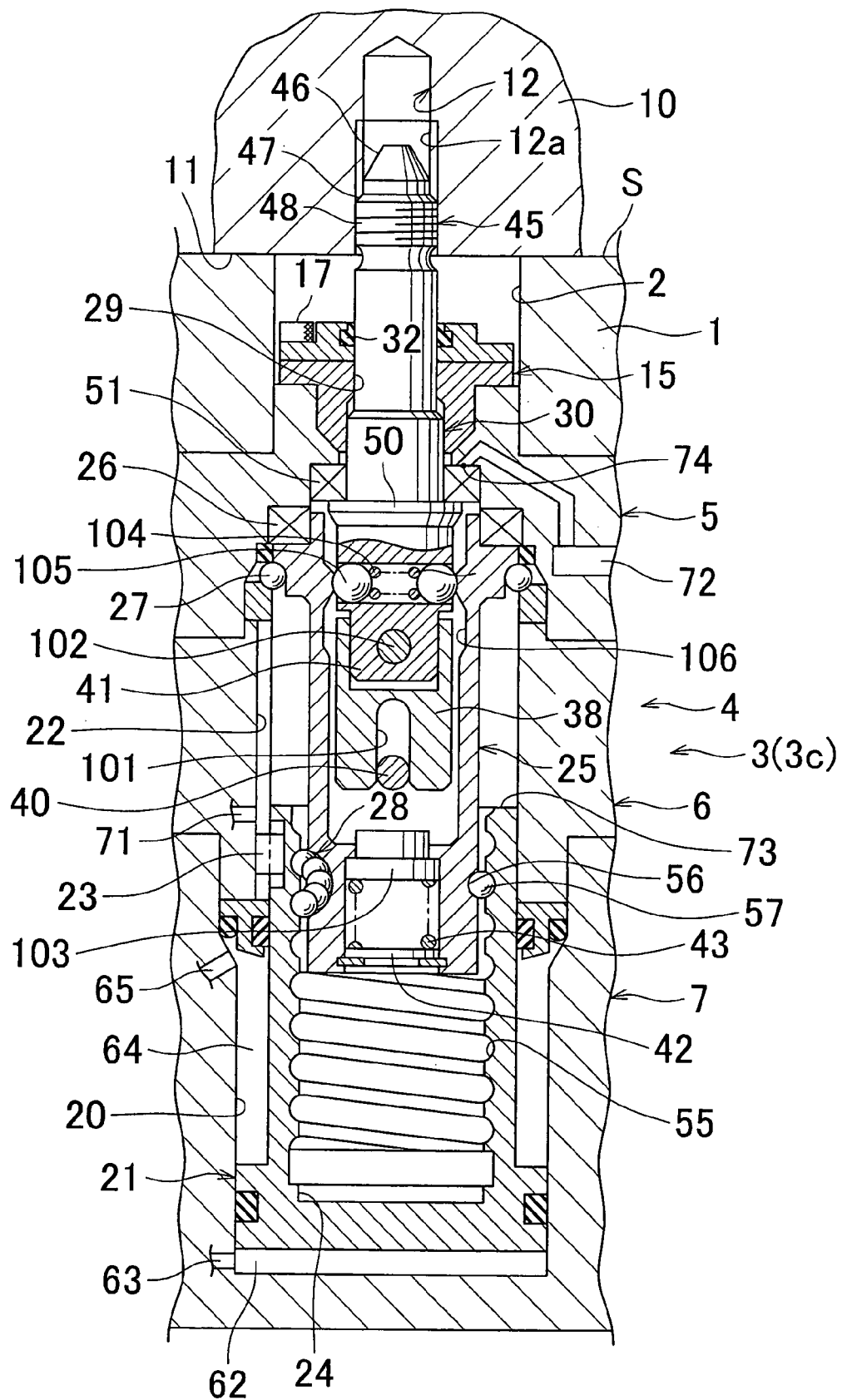
FIG. 7 is a view similar to FIG. 3, showing a clamping apparatus of a fourth embodiment of the present invention.
Figure 8:
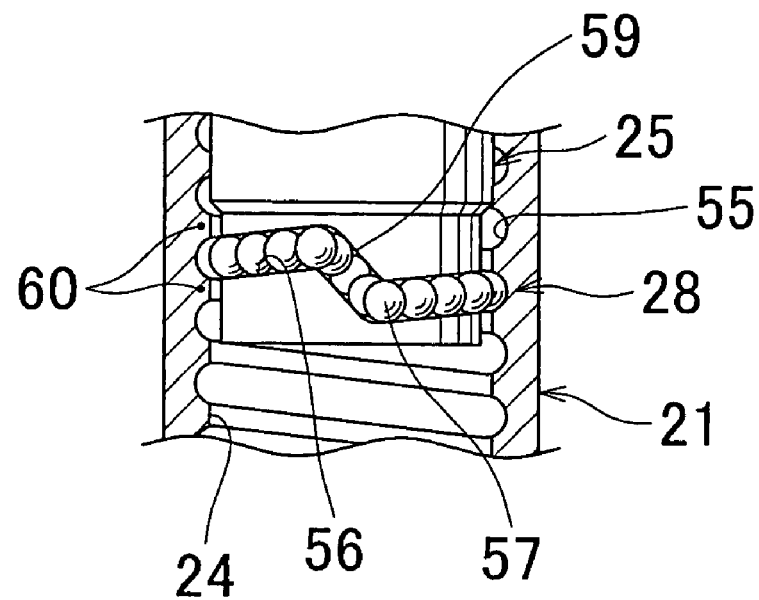
FIG. 8 is a sectional view of a ball screw mechanism provided in the clamping apparatus of FIG. 7.

FIG. 7 and FIG. 8 show a clamping apparatus of a fourth embodiment of the present invention. FIG. 7 is a view similar to FIG. 3. FIG. 8 is a partial sectional view of a left side view of FIG. 7, showing a ball screw mechanism provided in the clamping apparatus of FIG. 7.

This fourth embodiment is different in structure in the following point from the first embodiment of FIG. 3.

The ball screw mechanism 28 provided between the piston 21 and a rotating member 25 is formed of a right-handed screw. A release chamber 62 is formed below the piston 21, and a lock chamber 64 is formed above the piston 21. A transmission sleeve 38 is fitted to the rotating member 25 vertically movably. Vertical fitting between the transmission sleeve 38 and the joint pin 40 is made by a groove 101 extending vertically instead of the slot 39 of FIG. 3. An input portion 41 of the output rod 30 and the transmission sleeve 38 are connected by an upper pin 102.

When the output rod 30 and the transmission sleeve 38 are lowered, an urging force of the advancing spring 43 pushes up the output rod 30 via the upper spring seat 103 and the transmission sleeve 38. The output rod 30 in the lowered state is held in an inner peripheral groove 106 of the rotating member 25 by balls 105 projected radially outward by an expanding spring 104.

In the lock state of FIG. 7, the expanded portion 50 of the output rod 30 presses the upper thrust bearing 51 upward, and an upper surface of the upper thrust bearing 51 is in contact with the housing 4. Therefore, the pressure of compressed air rises in the second supply port 72 for detecting lock state. Specifically, by the upper surface of the upper thrust bearing 51 and the housing 4, the second opening and closing portion 74 is formed.

Further, when the lock state of FIG. 7 is changed into a release state, the piston 21 rises and an upper end surface of the piston 21 comes into contact with an upper portion of the rotating member 25. Thereby, the pressure of compressed air rises in the first supply port 71 for detecting release state. Specifically, the upper end surface of the piston 21 and the upper portion of the rotating member 25 form the first opening and closing portion 73.

Figure 9:
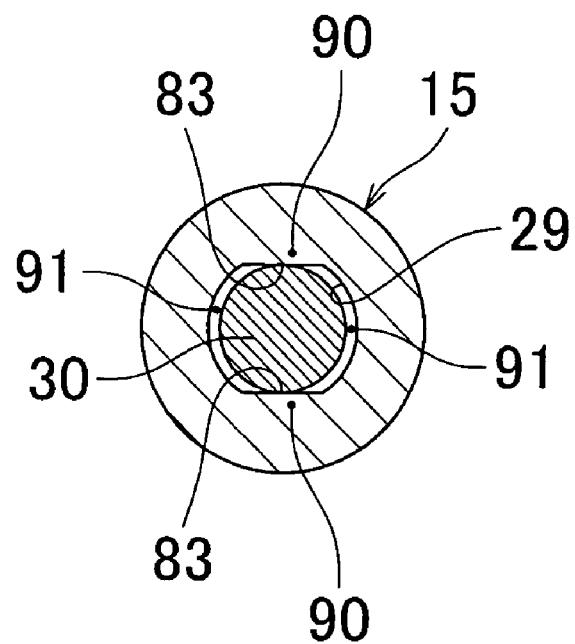
FIG. 9 is a view similar to FIG. 5B, showing an exemplary variation of the present invention.

FIG. 9 is a view similar to FIG. 5B, showing an exemplary variation.

In this case, the intermediate sleeve 88 of FIG. 5B is omitted, and the output rod 30 is directly inserted into the guide hole 29 of the guide cylinder 15. On the guide hole 29, protrusions 90, 90 radially facing are provided, and between these protrusions 90, 90, escape portions 91, 91 are provided. On an inner peripheral surface of each of the protrusions 90, 90, the female fitting portion 83 is formed.

FIG. 10 is a schematic plan view of a clamping system using the clamping apparatuses of the embodiments described above.

In this case, four internal threaded holes 121, 122, 123, 124 are arranged diagonally on the object 10 to be fixed, the datum type clamping apparatus 3c of FIG. 4B or FIG. 7 is made correspondent to the first internal threaded hole 121, the diamond-cut type clamping apparatus 3b of FIGS. 5A and 5B or FIG. 9 is made correspondent to the second internal threaded hole 122, and the free type clamping apparatus 3a of FIG. 1 and FIG. 3 is made correspondent to the third internal threaded hole 123 and the fourth internal threaded hole 124.

Further, the direction in which the protrusions 90, 90 (see FIG. 5B or FIG. 9) of the diamond-cut type clamping apparatus 3b face each other is set to a direction of preventing the object 10 to be fixed from rotating around the first internal threaded hole 121.

The above-described embodiments and exemplary variation are changeable as follows.

Either one of the means for detecting a release state or the means for detecting a lock state may be omitted, or both of these may be omitted.

The object 10 to be fixed in the clamping apparatuses of the present invention may be a jig, pallet, mold, assembled and finished goods or the like in place of the illustrated work.

In the datum type clamping apparatus 3c, the universal joint mechanism may be omitted.

The installation posture of the clamping apparatus may be formed by turning the illustrated posture upside down, or may be a horizontal posture or an oblique posture.

In the clamping system, among the clamping apparatuses 3a, 3b, 3c of the respective types, only a plurality of clamping apparatuses of the same type may be used, or one each or a plurality each of different types may be combined and used.

What is claimed is:

1. A screw engagement type clamping apparatus which pulls and fixes an object (10) to be fixed provided with an internal threaded hole (12) by a screw engagement force of an engaging bolt (45), comprising:

an annular piston (21) inserted into a cylinder hole (20) provided in a housing (4) so as to reciprocate axially and to be prevented from rotating;

a cylindrical rotating member (25) inserted into a cylindrical hole (24) of the piston (21) so as to be prevented from moving axially;

a ball screw mechanism (28) provided between the piston (21) and the rotating member (25) such that raising or lowering the piston causes rotation of the rotating member; and an output rod (30) rotatably and movably axially inserted into a guide hole (29) formed in the housing (4), an input portion (41) of the output rod (30) is connected to the rotating member (25) so as to be rotated thereby, and the bolt (45) provided on a leading end portion of the output rod (30) is constructed so as to engage with the internal threaded hole (12) of the object (10) to be fixed.

2. The screw engagement type clamping apparatus according to claim 1, wherein the guide hole (29) is formed radially inward from the cylindrical hole (24) of the piston (21), 3. The screw engagement type clamping apparatus according to claim 1, wherein the ball screw mechanism (28) includes a female spiral groove (55) having a plurality of pitches formed on the cylindrical hole (24) of the piston (21), at least one male spiral groove (56) having substantially one pitch formed on an outer peripheral surface of the rotating member (25), and a number of balls (57) inserted between the female spiral groove (55) and the male spiral groove (56) so as to roll, and a circulation passage (59) which communicatively connects a start end and a terminal end of the male spiral groove (56) is formed in a recessed manner on the outer peripheral surface of the rotating member (25), so as to allow the balls (57) to traverse a partition wall (60) formed between adjacent groove portions of the female spiral groove (55).

4. The screw engagement type clamping apparatus according to claim 1, including an advancing means (43) arranged to press the output rod (30) toward the internal threaded hole (12).

5. The screw engagement type clamping apparatus according to claim 4, wherein the advancing means (43) comprises a resilient element and is provided between the output rod (30) and the rotating member (25).

6. The screw engagement type clamping apparatus according to claim 1, wherein the housing (4) is provided with a supply port (71) into which a fluid for detecting a release state is supplied, and the supply port (71) is communicatively connected to an exterior space via an opening and closing portion (73) arranged so as to face in an axial direction between the rotating member (25) and the piston (21).

7. The screw engagement type clamping apparatus according to claim 1, wherein the housing (4) is provided with a supply port (72) into which a fluid for detecting a lock state is supplied, and the supply port (72) is communicatively connected to an exterior space via an opening and closing portion (74) arranged so as to face in an axial direction between the housing (4) and the output rod (30).

8. The screw engagement type clamping apparatus according to claim 1, wherein a transmission sleeve (38) is inserted into the rotating member (25) so as to transmit rotation and to be radially movable, and the input portion (41) of the output rod (30) is inserted into the transmission sleeve (38) so as to transmit rotation and to be axially movable.

9. The screw engagement type clamping apparatus according to claim 1, wherein between the guide hole (29) of the housing (4) and an outer peripheral surface of the output rod (30), an annular gap (31) which allows the output rod (30) to move radially is formed.

10. A clamping system comprising at least two screw engagement type clamping apparatuses according to claim 9.

11. The screw engagement type clamping apparatus according to claim 1, wherein the output rod (30) is supported in the guide hole (29) of the housing (4) so as to be prevented from moving radially.

12. The screw engagement type clamping apparatus according to claim 1, wherein female fitting portions (83), (83) are provided at a predetermined interval in an axial direction on the guide hole (29) of the housing (4), and male fitting portions (85), (85) are provided at a predetermined interval in the axial direction on an outer peripheral surface of the output rod (30), in a release state, the output rod (30) retreats, the female fitting portions (83) and the male fitting portions (85) are spaced axially from each other and the output rod (30) becomes radially movable in the guide hole (29), and in a lock state the output rod (30) advances, and the female fitting portions (83) and the male fitting portions (85) fit each other to constrain the output rod (30) radially in the guide hole (29).

13. The screw engagement type clamping apparatus according to claim 12, wherein the female fitting portions (83) and the male fitting portions (85) are constructed so as to fit along substantially the whole circumferences.

14. The screw engagement type clamping apparatus according to claim 12, wherein protrusions (90), (90) radially facing each other are provided on the guide hole (29), and escape portions (91), (91) are provided between these protrusions (90), (90), and the female fitting portion (83) is formed on an inner peripheral surface of each of the protrusions (90).

15. A clamping system comprising at least two screw engagement type clamping apparatuses according to claim 14.

16. The screw engagement type clamping apparatus according to claim 1, wherein at least one intermediate sleeve (88) is arranged between the guide hole (29) and the output rod (30), protrusions (90), (90) radially facing each other are provided on at least one of an outer peripheral surface of the intermediate sleeve (88) and the guide hole (29), and escape portions (91), (91) are provided between these protrusions (90), (90).

17. The screw engagement type clamping apparatus according to claim 1, wherein to the rotating member (25), a hollow rod (95) is connected instead of the output rod (30), and the engaging bolt (45) provided on a leading end portion of the hollow rod (95) is constructed to be hermetically connectable to an internal threaded hole (12) of a tested object (92) so that a testing pressurized fluid can be supplied to the tested object (92) via a distribution passage (98) formed in the hollow rod (95).

18. A clamping system comprising:
one screw engagement type clamping apparatus which pulls and fixes an object (10) to be fixed provided with an internal threaded hole (12) by a screw engagement force of an engaging bolt (45), having:
- an annular piston (21) inserted into a cylinder hole (20) provided in a housing (4) so as to reciprocate axially and to be prevented from rotating;
- a cylindrical rotating member (25) inserted into a cylindrical hole (24) of the piston (21) so as to be prevented from moving axially;
- a ball screw mechanism (28) provided between the piston (21) and the rotating member (25) such that raising or lowering the piston causes rotation of the rotating member; and
- an output rod (30) rotatably and movably axially inserted into a guide hole (29) formed in the housing (4), an input portion (41) of the output rod (30) is connected to the rotating member (25) so as to be rotated thereby, and the bolt (45) provided on a leading end portion of the output rod (30) is constructed so as to engage with the internal threaded hole (12) of the object (10) to be fixed;
- wherein the output rod (30) is supported in the guide hole (29) of the housing (4) so as to be prevented from moving radially;

one screw engagement type clamping apparatus which pulls and fixes an object (10) to be fixed provided with an internal threaded hole (12) by a screw engagement force of an engaging bolt (45), having:
- an annular piston (21) inserted into a cylinder hole (20) provided in a housing (4) so as to reciprocate axially and to be prevented from rotating;
- a cylindrical rotating member (25) inserted into a cylindrical hole (24) of the piston (21) so as to be prevented from moving axially;
- a ball screw mechanism (28) provided between the piston (21) and the rotating member (25) such that raising or lowering the piston causes rotation of the rotating member; and
- an output rod (30) rotatably and movably axially inserted into a guide hole (29) formed in the housing (4), an input portion (41) of the output rod (30) is connected to the rotating member (25) so as to be rotated thereby, and the bolt (45) provided on a leading end portion of the output rod (30) is constructed so as to engage with the internal threaded hole (12) of the object (10) to be fixed; and
- wherein female fitting portions (83), (83) are provided at a predetermined interval in an axial direction on the guide hole (29) of the housing (4), and male fitting portions (85), (85) are provided at a predetermined interval in the axial direction on an outer peripheral surface of the output rod (30),
- in a release state, the output rod (30) retreats, the female fitting portions (83) and the male fitting portions (85) are spaced axially from each other and the output rod (30) becomes radially movable in the guide hole (29), and
- in a lock state the output rod (30) advances, and the female fitting portions (83) and the male fitting portions (85) fit each other to constrain the output rod (30) radially in the guide hole (29); and
- wherein protrusions (90), (90) radially facing each other are provided on the guide hole (29), and escape portions (91), (91) are provided between these protrusions (90), (90), and the female fitting portion (83) is formed on an inner peripheral surface of each of the protrusions (90);

and at least one screw engagement type clamping apparatus which nulls and fixes an object (10) to be fixed provided with an internal threaded hole (12) by a screw engagement force of an engaging bolt (45), having:
- an annular piston (21) inserted into a cylinder hole (20) provided in a housing (4) so as to reciprocate axially and to be prevented from rotating;
- a cylindrical rotating member (25) inserted into a cylindrical hole (24) of the piston (21) so as to be prevented from moving axially;
- a ball screw mechanism (28) provided between the piston (21) and the rotating member (25) such that raising or lowering the piston causes rotation of the rotating member; and
- an output rod (30) rotatably and movably axially inserted into a guide hole (29) formed in the housing (4), an input portion (41) of the output rod (30) is connected to the rotating member (25) so as to be rotated thereby, and the bolt (45) provided on a leading end portion of the output rod (30) is constructed so as to engage with the internal threaded hole (12) of the object (10) to be fixed;
- wherein between the guide hole (29) of the housing (4) and an outer peripheral surface of the output rod (30), an annular gap (31) which allows the output rod (30) to move radially is formed.

19. A fluid pressure actuator, comprising:
an annular piston (21) inserted into a cylinder hole (20) provided in a housing (4) so as to reciprocate axially and to be prevented from rotating;
a rotating member (25) inserted into a cylindrical hole (24) of the piston (21) so as to be prevented from moving axially;
a ball screw mechanism (28) provided between the piston (21) and the rotating member (25), the ball screw mechanism (28) includes a female spiral groove (55) having a plurality of pitches formed on the cylindrical hole (24) of the piston (21), at least one male spiral groove (56) having substantially one pitch formed on an outer peripheral surface of the rotating member (25), and a number of balls (57) inserted between the female spiral groove (55) and the male spiral groove (56) so as to roll; and
a circulation passage (59) which communicatively connects a start end and a terminal end of the male spiral groove (56) is formed in a recessed manner on the outer peripheral surface of the rotating member (25), so as to allow the balls (57) to get over a partition wall (60) formed between adjacent groove portions of the female spiral groove (55).

20. The fluid pressure actuator according to claim 19, wherein
a transmission sleeve (38) is inserted into the rotating member (25) so as to transmit rotation and to be radially movable, and an input portion (41) of an output rod (30) is inserted into the transmission sleeve (38) so as to transmit rotation.

* * * * *